(12) United States Patent
Davies et al.

(10) Patent No.: US 9,738,335 B2
(45) Date of Patent: Aug. 22, 2017

(54) ROBOTIC CLIMBING PLATFORM

(71) Applicant: INVERT ROBOTICS LIMITED, Lincoln (NZ)

(72) Inventors: Thomas Henry Davies, Christchurch (NZ); Benjamin James Kumar Sachdeva, Riccarton (NZ); Liam George Somerville, Rotorua (NZ); Andrew William Taylor, Winton (NZ); James Grant Robertson, Christchurch (NZ); XiaoQi Chen, Christchurch (NZ)

(73) Assignee: INVERT ROBOTICS LIMITED, Lincoln (NZ)

( * ) Notice: Subject to any disclaimer, the term of this patent is extended or adjusted under 35 U.S.C. 154(b) by 114 days.

(21) Appl. No.: 14/348,529

(22) PCT Filed: Oct. 1, 2012

(86) PCT No.: PCT/NZ2012/000175
§ 371 (c)(1),
(2) Date: Mar. 28, 2014

(87) PCT Pub. No.: WO2013/048263
PCT Pub. Date: Apr. 4, 2013

(65) Prior Publication Data
US 2014/0216836 A1 Aug. 7, 2014

(30) Foreign Application Priority Data
Sep. 30, 2011 (NZ) ........................................ 595509

(51) Int. Cl.
*B60B 39/00* (2006.01)
*B62D 55/265* (2006.01)
(Continued)

(52) U.S. Cl.
CPC ........... *B62D 55/265* (2013.01); *B62D 55/06* (2013.01); *B62D 57/024* (2013.01); *Y10S 901/01* (2013.01)

(58) Field of Classification Search
CPC ............................ B62D 55/265; B62D 57/024
(Continued)

(56) References Cited

U.S. PATENT DOCUMENTS 4,095,378 A * 6/1978 Urakami ................. B24C 3/062
114/222
4,477,998 A 10/1984 You
(Continued)

FOREIGN PATENT DOCUMENTS

EP 1330387 B1 7/2003
WO 2011/029206 A1 3/2011

OTHER PUBLICATIONS

International Search Report; PCT/NZ2012/000175; Jan. 24, 2013.
Written Opinion of the International Searching Authority; PCT/NZ2012/000175; Jan. 24, 2013.

*Primary Examiner* — Joseph M Rocca
*Assistant Examiner* — Conan D Duda
(74) *Attorney, Agent, or Firm* — Studebaker & Brackett PC

(57) ABSTRACT

A robotic climbing platform has a chassis and a carriage adapted to support and move the chassis relative to a climbing surface. An adhesion mechanism provides an adhesion force between the climbing platform and the climbing surface. The adhesion mechanism has one or more suction pads adapted to retain an adhesion force between the climbing platform and the climbing surface during movement of the chassis relative to the climbing surface.

22 Claims, 6 Drawing Sheets

(51) Int. Cl.
*B62D 55/06* (2006.01)
*B62D 57/024* (2006.01)

(58) Field of Classification Search
USPC ............. 180/8.1, 8.2, 8.5, 8.6, 8.7, 125, 901
See application file for complete search history.

(56) References Cited

U.S. PATENT DOCUMENTS

| | | | |
|---|---|---|---|
| 4,674,949 A * | 6/1987 | Kroczynski | 414/749.1 |
| 4,785,902 A * | 11/1988 | Ochiai | 180/164 |
| 4,926,957 A | 5/1990 | Urakami | |
| 4,940,382 A * | 7/1990 | Castelain et al. | 414/749.1 |
| 4,971,591 A * | 11/1990 | Raviv et al. | 446/177 |
| 5,077,510 A * | 12/1991 | Collie | 318/568.12 |
| 5,094,311 A * | 3/1992 | Akeel | 180/119 |
| 5,121,805 A | 6/1992 | Collie | |
| 5,536,199 A | 7/1996 | Urakami | |
| 5,551,525 A | 9/1996 | Pack et al. | |
| 5,752,577 A | 5/1998 | Urakami | |
| 5,839,532 A * | 11/1998 | Yoshiji et al. | 180/164 |
| 5,890,553 A * | 4/1999 | Bar-Cohen et al. | 180/8.1 |
| 6,099,091 A * | 8/2000 | Campbell | 305/4 |
| 7,280,890 B2 * | 10/2007 | Seemann | 700/245 |
| 7,775,312 B2 | 8/2010 | Maggio | |
| 2002/0036108 A1 | 3/2002 | Jeswine et al. | |
| 2003/0009844 A1* | 1/2003 | Bruntrup et al. | 15/344 |
| 2007/0163827 A1* | 7/2007 | Imus et al. | 180/164 |
| 2008/0077276 A1* | 3/2008 | Montero Sanjuan et al. | 700/245 |
| 2011/0024215 A1 | 2/2011 | Saylor, Jr. | |
| 2011/0192665 A1* | 8/2011 | Chen | 180/164 |
| 2012/0181096 A1* | 7/2012 | Niederberger | 180/9.42 |
| 2012/0187752 A1* | 7/2012 | Niederberger | 305/165 |

\* cited by examiner

ROBOTIC CLIMBING PLATFORM

FIELD

This invention relates to the field of remote controlled mobile robotic devices. More particularly this invention relates to sliding suction type climbing robots.

BACKGROUND

Climbing robots are used for a variety of applications, such as window cleaning, structural inspections, reconnaissance and sensor deployment.

Adhesion and locomotion are two key functions of a climbing robot. Locomotion can be achieved via mechanisms such as wheels, tracks or actuated legs. Numerous adhesion mechanisms exist for holding climbing robots to the surfaces they will move along, including magnetic and electrostatic mechanisms, ducted fans, non-contact Bernoulli type attractors and vacuum adhesion mechanisms.

Based on the means of generating adhesion force to the wall, vacuum adhesion mechanisms can be classified into two main types: active vacuum which requires continuous power to maintain a vacuum and passive vacuum in which power is required to generate or release a vacuum but not to maintain it. The overall energy required maintaining adhesion to the wall, the noise pollution levels, the range of applicable surfaces and the mechanical complexity of each mechanism varies.

For example, the amount of energy required per kilogram of robot weight can be 2 kW/kg adhesion force for a ducted fan, 600 W/kg for a non contact adhesion device, 30 W/kg for a vacuum pump cup configuration.

Active Vacuum Generating Mechanisms

Active vacuums require constant power supply, potentially reducing the operating duration of a climbing robot by draining batteries faster. Active vacuums also require a vacuum pump, adding weight and reducing payload capacity.

Passive Vacuum Generating Mechanisms

U.S. Pat. No. 4,477,998 discloses a wall climbing toy with suction disks mounted on a conveyable belt as the adhesion mechanism. The belt is driven by a motor which allows it to rotate and wires are attached to the suction cups in order to prime and release the suction cups at the initiation and completion of each suction cup's contact with the surface.

WO2011/029206 discloses a suction device for robotic climbing applications which includes at least one flexible suction cup where suction is created by a rod attached at one end to the suction cup and at the other to a vacuum actuator. Movement of the actuator raises the centre of the suction cup thereby creating a vacuum. The pads adhere one, at a time and the device rotates its way up the wall, resulting in slow movement.

Yoshida et al (Design of a wall climbing Robot with Passive Suction Cups, Yoshida et al, IEEE International Conference on Robotics and Biomimetics (ROBIO), 2010) discloses a wall climbing robot.

The design incorporates multiple passive suction cups mounted on the outer surface of a rotating belt and involves an on/off release function, similar to that disclosed in U.S. Pat. No. 4,477,978. Yoshida notes problems with the design such as significant difficulty encountered when moving the robot on the wall.

U.S. Pat. No. 7,775,312 discloses a rolling vacuum seal mechanism and suggests that sliding suction climbing devices have significant faults such as premature and excessive wear on the seal portion and an inability to negotiate surface obstructions without suction loss. The references cited in U.S. Pat. No. 7,775,312 (U.S. Pat. No. 4,926,957, U.S. Pat. No. 5,536,199 and U.S. Pat. No. 5,752,577) all require an active vacuum source such as a vacuum pump or blower.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date.

SUMMARY OF THE INVENTION

One object of the invention is to provide a robotic platform based on low-energy passive suction cup principles which can adhere to and move on inclined or inverted surfaces, or which will at least provide the public or industry with a useful choice. Other objects of the invention may become apparent from the following description which is given by way of example only.

According to one aspect the present invention may broadly be said to consist in an adhesion mechanism for a robotic climbing platform comprising a chassis from which one or more passive suction pads are supported, and an actuator arranged to act between the suction pad and the chassis. The actuator is capable of exerting force on the suction pad in the direction toward a climbing surface so as to depress the pad against the climbing surface in order to evacuate gases between the pad and the climbing surface and then apply a force on the centre of the suction pad in the direction towards the chassis to form a substantial seal between the outer areas of the suction pad and the climbing surface to create a passive vacuum adhesion force. The suction pad outer surface comprises a friction coefficient low enough to allow the pad to slide along the intended climbing surface when driven via a locomotion mechanism of the robotic climbing platform.

Preferably the actuator is capable of re-priming the suction pad to re-establish the required vacuum force when a loss of vacuum occurs or is about to occur.

Preferably the mechanism includes a servo motor and cam which together provide the actuation force on the suction pad in the direction towards the climbing surface and a spring mechanism is used to provide the force on the suction pad in the direction of the chassis.

Preferably the mechanism includes a controller, and a mounted sensor which identifies when vacuum force is about to fail and the controller instructs the actuator to reprime the suction pad on the basis of the output of the sensor.

Preferably the mechanism includes a source of stored power, such as a battery, to actuate the suction pads.

In this application re-priming refers to the action of forcing out air between the pad and the climbing surface by applying force from the chassis direction towards the climbing surface and then applying a force in the opposite direction towards the chassis to generate a vacuum between the suction pad and climbing surface.

According to a further aspect the invention may broadly be said to consist in a modular mobile robot platform for inspection applications comprising a sliding suction pad mechanism as set forth in one or more of the paragraphs above, a wheeled or tracked locomotion mechanism, and modular elements attachable to the platform which include functions such as remote controllers, wireless communication, camera and video elements, sensors and other tools.

According to a further aspect the present invention may broadly be said to consist in an adhesion mechanism for a robotic climbing platform comprising a chassis, a belt which also serves as the locomotion method when driven by a motor, the belt including a belt path with a climbing surface contact portion and a return portion, one or more suction pads mounted so as to be capable of adhering to the inner surface of the belt in the climbing surface contact portion of the belt path, to the belt being constructed such that when a vacuum force is applied to the belt by the suction pad, at least a part of this vacuum force is applied to the climbing surface through the belt, such that the robotic platform adheres to the climbing surface.

Preferably the vacuum force is created by an actuator attached to the at least one suction pad which can be actuated to exert a force on the suction pad in the direction of the climbing surface so as to evacuate any air between the pad and the inner belt surface and through to the climbing surface before then applying a force on the centre of the suction pad in the direction of the chassis so as to form a substantial seal between the suction pad and inner belt surface and a corresponding passive vacuum adhesion force between the area of the outer belt surface affected by the vacuum and the climbing surface. The friction levels of the inner belt surface and the suction cup are sufficient to allow the belt to slide over the suction cup while retaining the substantial seal.

Preferably at least one actuated cam is capable of re-priming the at least one suction pad to re-establish the required vacuum force when a loss of vacuum occurs or is about to occur.

Preferably the mechanism includes a servo motor and cam to provide the actuated force on the suction pad in the direction towards the climbing surface and a spring mechanism is used to provide the force on the suction pad in the direction of the chassis.

Preferably the belt has a low friction coefficient on the inside surface of the belt, a high friction coefficient on the outside surface of the belt and a soft, deforming outer surface of the belt.

Preferably the mechanism includes two rollers, one at each end of the climbing surface contact portion of the belt path with one roller being free-wheeling and the other driven by a motor.

Preferably the mechanism includes at least one secondary roller to provide additional clearance between the return portion of the belt path and the contact portion of the belt path.

Preferably the mechanism includes servo motors to rotate the cams which apply force on the suction pads in order to evacuate any air from between the pad and inside surface of the belt, and between the outside surface of the belt and the climbing force prior to applying upwards force in the direction of the chassis to form the vacuum.

Preferably the mechanism includes chassis rails as mounting points for the servo motors and for spring plates.

Preferably the mechanism includes spring plates to locate the suction pads and to secure them to the chassis. The spring plates are configured to provide the necessary force to generate the required vacuum level between the belt and the climbing surface.

Preferably leg springs are attached to the spring plates to apply a predetermined tension to the belt.

The mechanism may include chassis blocks to strengthen the chassis and maintain the required distance between the chassis and chassis rails Preferably the suction pads are stationary relative to the robot chassis and only capable of movement in directions perpendicular to the chassis.

Preferably the mechanism includes a source of stored power, such as a battery, to actuate the suction pads.

Preferably the mechanism includes a mounted sensor which identifies when vacuum force is about to fail and a controller which instructs the actuator to re-prime the at least one suction pad in accordance with an output from the sensor.

According to further aspect the present invention may broadly be said to consist in a modular mobile robot platform suitable for inspection applications comprising an adhesion mechanism as set forth in one or more of the paragraphs above, a motor to drive the sliding suction pad mechanism, and modular elements attachable to the platform which include functions such as remote controllers, wireless communication, camera and video elements, sensors and other tools.

According to another aspect the present invention may broadly be said to consist in an adhesion method and locomotion method comprising: fixing a robotic platform to a climbing surface by forcing out air trapped between at least one suction pad and the climbing surface; creating a vacuum area between the climbing surface and the lower surface of the at least one suction pad with sufficient force to maintain adherence of the platform to the climbing surface yet low enough friction to enable locomotion along the climbing surface.

Preferably the method includes depressing the suction pad towards the climbing surface in order to remove gases trapped between the pad and the surface, and applying a force to the pad away from the surface to create a substantial seal between the lower pad surface and the climbing surface.

Preferably the method includes re-priming the suction pads when the vacuum force sufficient to maintain adhesion to the wall during locomotion is about to fail.

According to a further aspect the present invention may broadly be said to consist in robotic climbing platform comprising a chassis adapted to support a control system and an adhesion mechanism, the adhesion mechanism comprising at least one actuator and one or more suction pads adapted to form an adhesion force between the climbing platform and a climbing surface, the control system comprising a controller configured to receive a signal from one or more sensors adapted to measure the adhesion force between the suction pad and the climbing surface, the controller further configured to output a signal to cause movement of the actuator, and compare the measured the adhesion force to one or more characteristics.

Preferably the actuator has a first end connected to the chassis and another end connected to a suction pad, the actuator adapted to cause movement of the suction pad toward to the climbing surface by application of a first force and cause movement of the suction pad toward the chassis by application of a second force such that a seal between the climbing surface the suction pad is achieved.

Preferably one characteristic is a predetermined optimum adhesion force indicated by one or more of the vacuum between the suction pad and the climbing surface, the distance between the actuator and the climbing surface, or the location of the seal.

Preferably the controller is further configured to output a signal to vary the second force such that the predetermined optimum desired adhesion force is achieved between the suction pad and the climbing surface.

Preferably one characteristic is one of a predetermined minimum desired adhesion force.

Preferably the controller is further configured to control a re-priming procedure when the measured the adhesion force is less than a predetermined minimum desired adhesion force comprising the steps of outputting a signal to cause the actuator to generate the second force such that the suction pad is detached from the climbing surface, outputting a signal to cause the actuator to generate a first force to actuate the suction pad into the climbing surface, outputting a signal to cause the actuator to generate the second force such that the predetermined optimum desired adhesion force is achieved.

Preferably the platform further comprises a carriage adapted to move the chassis relative to the climbing surface.

Preferably the adhesion mechanism is adapted to retain a vacuum between a suction pad and the climbing surface during movement of the chassis relative to the climbing surface.

Preferably the suction pads comprise a rubber material.

Preferably the suction pads comprise reinforcement fibres.

Preferably the reinforcement fibres are adapted to create a uniform seal between the suction pads and the climbing surface.

According to a further aspect the present invention may broadly be said to consist in a robotic climbing platform comprising a chassis and a carriage adapted to support and move the chassis relative to a climbing surface, an adhesion mechanism adapted to provide an adhesion force between the climbing platform and the climbing surface, wherein the adhesion mechanism comprises one or more suction pads adapted to retain an adhesion force between the climbing platform and the climbing surface during movement of the chassis relative to the climbing surface.

Preferably the platform further comprises an actuator having a first end connected to the chassis and another end connected to the suction pads, the actuator adapted to generate a first force to actuate one or more suction pads in a direction toward the climbing surface.

Preferably the actuator is adapted to generate a second force on the centre of the suction pad in a direction toward the chassis.

Preferably the actuator comprises a servo motor adapted to rotate a cam to press against an actuation rod adapted to press against the suction pad to thereby generate the first force in the direction towards the climbing surface.

Preferably the actuator comprises a spring preloaded to provide a second force on the suction pad in the direction of the chassis.

Preferably the first force actuates the suction pad toward the climbing surface to deform the suction pad and evacuate gases between the pad and the climbing surface.

Preferably the second force provides a substantial seal between outer areas of the suction pad and the climbing surface such that an adhesion force between the suction pad and climbing surface is created.

Preferably the adhesion force is a vacuum created between the suction pad and the climbing surface.

Preferably the one or more suction pads have a suction surface that substantially conforms to the contour of the climbing surface.

Preferably the magnitude of the adhesion force is controllable by varying the magnitude the magnitude of the second force.

Preferably the one or more suction pads have a substantially planar suction surface when not forced toward the climbing surface.

Preferably one or more sensors adapted to measure the adhesion force between the one or suction pads and the climbing surface and output a signal representative of the adhesion force.

Preferably a control system is configured to receive a signal from a sensor adapted to measure a parameter indicative of the adhesion force, output a signal to cause movement of the actuator, and compare the measured the adhesion force to one or more characteristics.

Preferably one characteristic is a predetermined optimum adhesion force indicated by one or more of the vacuum between the suction pad and the climbing surface, the distance between the actuator and the climbing surface, or the location of the seal.

Preferably the control system is further configured to output a signal to vary the second force such that the predetermined optimum desired adhesion force is achieved between the suction pad and the climbing surface.

Preferably the control system is further configured to perform a re-priming procedure when the measured the adhesion force is less than a predetermined minimum desired adhesion force, comprising the steps of outputting a signal to cause the actuator to generate the second force such that the suction pad is detached or substantially not adhered to the climbing surface, outputting a signal to cause the actuator to generate a first force to actuate the suction pad into the climbing surface, outputting a signal to cause the actuator to generate the second force such that the predetermined optimum desired adhesion force is achieved.

Preferably the platform further comprises a source of stored power adapted to energise at least the control system, motors and actuators.

Preferably the climbing surface is stainless steel.

Preferably the suction pads are approximately 100 mm in diameter.

Preferably the suction pads are at least 3.8 mm thick.

Preferably the suction pads are up to 7.5 mm thick.

Preferably the suction pads are approximately 4.8 mm thick.

Preferably the suction pads are constructed of a material comprising reinforcing fibres.

Preferably the reinforcing fibres are distributed such that the suction pad is adapted to create a sealing surface against the climbing surface in a substantially uniform shape.

Preferably the reinforcing fibres are a mesh.

Preferably the suction pads have internal angles of less than 180 degrees.

Preferably the suction pads are constructed from nitrile rubber.

Preferably the suction pads are constructed from insertion reinforced rubber.

Preferably the suction pads are constructed from insertion 2× reinforced rubber.

Preferably the suction pads are at least 80 in diameter.

Preferably the suction pads are up to 120 mm in diameter.

Preferably the actuator attachment to a suction pad is at least 20 mm in diameter.

Preferably the suction pads are substantially circular and have a conical actuator attachment.

Preferably the suction pad has a diameter greater than 2.5× the diameter of an actuator attachment.

Preferably the actuator attachment is up to 40 mm in diameter.

Preferably the at least one spring plate is adapted to support at least one suction pad from the chassis and provide, together with the actuator or in isolation, the second force.

Preferably the at least one spring plate is adapted to be preloaded provide a force on the suction pad toward the climbing surface and the actuator operable to provide the first force opposing the second force of the spring plate.

Preferably the carriage comprises a plurality of wheels adapted to support the chassis from the climbing surface, the wheels rotatable to move the chassis relative to the climbing surface.

Preferably a motor is adapted to turn at least one wheel when energised.

Preferably the carriage comprises a belt wrapped around at least two rollers thereby forming a track, the rollers rotatable to move the chassis relative to the climbing surface.

Preferably a motor is adapted to turn at least one roller when energised.

Preferably the belt comprises an inner surface, an outer surface, a climbing surface contact portion and a return portion.

Preferably the one or more suction pads have a suction surface located adjacent the inner surface of the belt and the climbing surface contact portion.

Preferably the outer belt surface is deformable such that regions of adhesion force can be created between the belt outer surface and the climbing surface.

Preferably the adhesion force is created between a suction pad and a vacuum region creatable between the suction pad and inner belt surface.

Preferably the adhesion force is created between a suction pad and a vacuum region creatable between suction pad an inner belt surface that deforms the outer belt surface and generates a vacuum region between outer belt surface and climbing surface.

Preferably the inner surface of the belt is adapted to allow the belt to slide past or over the suction cup whilst substantially retaining the adhesion force.

Preferably the outer surface of the belt is constructed of a material having a high friction coefficient such that the climbing surface is able to be gripped.

Preferably at least one of the inner surface of the belt or the suction pad is of a material having a low friction coefficient such that the suction pads may slide across the inner portion of the belt while retaining an adhesion force.

Preferably the carriage includes at least one roller to support the return portion of the belt from the climbing surface contacting portion of the belt.

Preferably the platform further comprises blocks adapted to strengthen the chassis and maintain a distance between the chassis and chassis rails.

Preferably the suction pads are adapted to move only in a direction perpendicular to the chassis.

According to a further aspect the present invention may broadly be said to consist in a robotic climbing platform comprising a chassis connected to at least two rollers and a belt wrapped around the rollers to form a track adapted to support the chassis, the rollers rotatable to move the chassis relative to a climbing surface, the belt comprising an inner surface, an outer surface, a climbing surface contact portion and a return portion, an adhesion mechanism adapted to provide an adhesion force between the chassis and the climbing surface comprising one or more suction pads having a suction surface located adjacent the inner surface of the belt and the climbing surface contact portion, wherein the adhesion force is created between a suction pad and a vacuum region creatable between suction pad an inner belt surface that deforms the outer belt surface and generates a vacuum region between outer belt surface and climbing surface.

Preferably a motor is adapted to turn at least one roller when energised.

Preferably the adhesion mechanism is adapted to retain an adhesion force between the chassis and the climbing surface during movement of the chassis relative to the climbing surface.

Preferably the inner surface of the belt is adapted to allow the belt to slide past or over the suction cup whilst substantially retaining the adhesion force.

Preferably the outer surface of the belt is constructed of a material having a high friction coefficient such that the climbing surface is able to be gripped.

Preferably at least one of the inner surface of the belt or the suction pad is of a material having a low friction coefficient such that the suction pads may slide across the inner portion of the belt while retaining an adhesion force.

Preferably a sliding seal climbing surface adhesion mechanism is provided by one or more suction cups adapted to slide over a climbing surface while retaining the adhesion and a control system configured to periodically attach the suction cups to a climbing surface.

Preferably the chassis is adapted to support inspection and control devices comprising any one or more of remote controllers, wireless communication, camera and video elements, sensors, and tools.

According to a further aspect the present invention may broadly be said to consist in a method of operating a robotic climbing platform comprising providing a chassis adapted to support a control system and an adhesion mechanism comprising at least one actuator connected one or more suction pads, configuring a control system to perform the steps of operating the actuator to generate a first force on a suction pad in the direction of a climbing surface, and operating the actuator to generate a second force on a suction pad in the direction of the chassis.

Preferably configuring the control system further comprises the steps of adapting one or more sensors to measure the adhesion force between the suction pad and the climbing surface, receiving a signal from the one or more sensors indicative of the adhesion force, comparing the measured the adhesion force to one or more characteristics, and outputting a signal to cause movement of the actuator.

Preferably one characteristic is a predetermined optimum adhesion force indicated by one or more of the vacuum between the suction pad and the climbing surface, the distance between the actuator and the climbing surface, or the location of the seal.

Preferably one characteristic is one of a predetermined minimum desired adhesion force.

Preferably the control system is further configured to control a re-priming procedure comprising the steps of determining the adhesion force is less than a predetermined minimum desired adhesion force, outputting a signal to cause the actuator to generate the second force such that the suction pad is detached from the climbing surface, outputting a signal to cause the actuator to generate a first force to actuate the suction pad into the climbing surface, outputting a signal to cause the actuator to generate the second force such that the predetermined optimum desired adhesion force is achieved.

Preferably the control system is further configured to energise a carriage adapted to move the chassis relative to the climbing surface.

According to a further aspect the present invention may broadly be said to consist in a method of operating a robotic climbing platform comprising providing a chassis and a carriage adapted to support and move the chassis relative to a climbing surface, adapting an adhesion mechanism to provide an adhesion force between the climbing platform and the climbing surface, comprising one or more suction pads adapted to retain an adhesion force between the climbing platform and the climbing surface during movement of the chassis relative to the climbing surface.

According to a further aspect the present invention may broadly be said to consist in a method of operating a robotic climbing platform comprising providing a chassis and a belt wrapped around at least two rollers thereby forming a track adapted to support the chassis, the rollers rotatable to move the chassis relative to a climbing surface, the belt comprising an inner surface, an outer surface, a climbing surface contact portion and a return portion, adapting an adhesion mechanism to provide an adhesion force between the chassis and the climbing surface, the adhesion mechanism comprising one or more suction pads having a suction surface located adjacent the inner surface of the belt and the climbing surface contact portion, generating a vacuum region between suction pad an inner belt surface that deforms the outer belt surface and generates a vacuum region between outer belt surface and climbing surface, and energising a motor to drive at least one roller wherein the vacuum region is retained.

Preferably the method further comprises operating the platform in a zone window cleaning, inspection, reconnaissance or sensor deployment.

Preferably the method further comprises operating inspection and control devices comprising any one or more of remote controllers, wireless communication, camera and video elements, sensors, and tools.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

It is intended that reference to a range of numbers disclosed herein (for example, 1 to 10) also incorporates reference to all rational numbers within that range (for example, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

DETAILED DESCRIPTION OF EMBODIMENTS

Preferred embodiments of the present invention will be described with reference to the accompanying drawings. The embodiments do not represent the full scope of the invention, but rather the invention may be employed in other embodiments.

The present invention provides a passive vacuum based adhesion mechanism that is designed to slide on an inclined or inverted surface while maintaining vacuum. Such a device enables construction of climbing robots which include some or all of the following advantages, including that they adhere more reliably, are easier to control, can carry higher payloads, move faster, require less power, operate for increased duration and require less maintenance than existing climbing robot designs.

Figure 1:
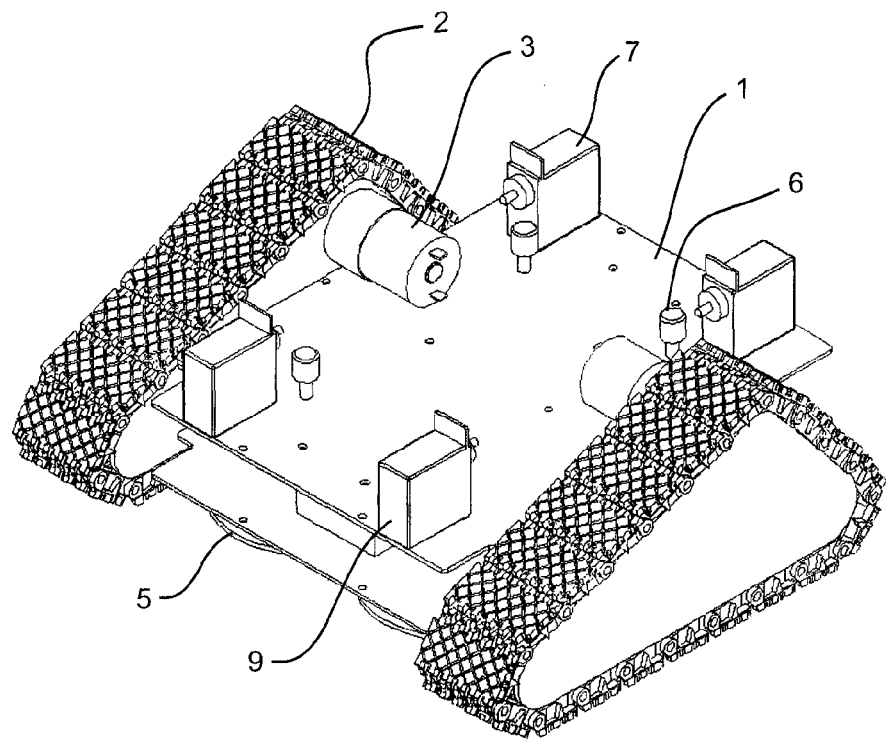
FIG. 1 is a perspective view of a tracked robot platform according to one embodiment of the invention.
Figure 2:
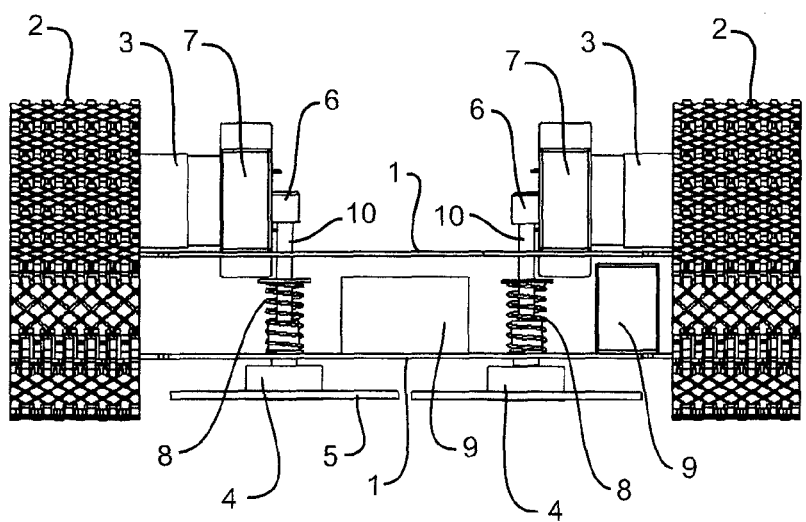
FIG. 2 is a side view of a robot platform according to one embodiment of the invention.

FIGS. 1 and 2 depict a robotic climbing platform. The platform has a chassis (1) which is supported by a pair of tracks (2). Each track is each driven by an electric motor (3). In an alternative embodiment the tracks (2) could be wheels. The tracks (2) or wheels could be powered by means other than by electric motors (3) such as internal combustion motors.

One or more suction mechanisms (4) including deformable pad surfaces (5) are connected to the chassis (1) by an actuator (6, 7, 10, 8). One form of the actuator has actuation rods (10) and springs (8) and cams driven by servo motors (7).

On board electronics (9) includes a controller to control the motors (3 and 7), actuators, interface with onboard sensors and communicate with a remote controller (not shown). The climbing robot platform may be controlled via a wireless communication means.

The controller may be configured to receive or determine information relating to the level of vacuum within the suction pad, the estimated time remaining before vacuum is lost within the pad, the location of the contact ring sealing the vacuum within the pad, the environmental conditions surrounding the pad and the surface roughness of the material the pad is attached to and the distance from the centre of the suction pad to the climbing surface.

For example, the controller may be configured to receive a signal from a sensor that is adapted to measure the vacuum force under each primed suction pad. The controller uses the measured vacuum force to control the actuators to re-prime suction pads when the vacuum drops below a level that may cause the suction pad to detach from a climbing surface.

In another example, the controller may have data input or stored that relates to the suction pad material type and the climbing surface material type. The controller may store data relating to the desired range of vacuum forces for a particular combination of pad material and climbing surface material and/or the condition of the climbing surface including surface roughness and general condition, such that adhesion can be ensured. If the measured vacuum drops below a desired level, or threshold, the controller may instigate a suction pad re-priming process so that a higher level of vacuum force and therefore adhesion can be attained.

In another example, the controller may also have input to it a sensor input representative of the deformation of the suction pad itself. Such information may include the location of the sealing ring of the suction pad or the distance between the actuator and the climbing surface. The suction pad may lose adhesion to a climbing surface due to pad deformation. The controller may determine when the pad is deforming by way of the sealing edge of the pad creeping toward the edge of the pad and will subsequently lose vacuum and adhesion to the climbing surface. The controller may instigate a suction pad re-priming process so that a higher level of vacuum force can be attained.

The controller may also store a predetermined time interval over which re-priming should take place. The time interval may be based on test data for a particular combination of pad material and climbing surface material or condition. Other environmental conditions such as temperature and humidity may be considered and further influence the re-priming frequency.

Preferably the controller is configured to control the distance the actuators move the suction pads or at least the force to be applied to the suction pad by the actuator. For example, the actuator is adapted to move the suction pad toward the climbing surface by exerting a first force upon the suction pad. The first force is adequate to deform a suction pad such that the air is substantially evacuated from beneath the suction pad.

The actuator is further adapted to move the suction pad away from the climbing surface by exerting a second force on the suction pad. The actuator pulls the suction pad away from the climbing surface such that a seal between the pad and the climbing surface is achieved. The magnitude of the second force applied to the suction pad controls the magnitude of the vacuum and therefore the adhesion force between the suction pad and the climbing wall. The controller may measure the level of the vacuum force generated by the suction pad and/or the deformation of the suction pad and alter the second force to an optimum characteristic.

The controller may be implemented by a microprocessor or similar device. Alternatively the controller may be implemented by a computer external to the robot where data is relayed from sensors onboard the robot to the computer for processing via wired or wireless means.

In the preferred embodiment multiple suction mechanisms (4) are supported by the chassis (1). The suction mechanism (4) consists of at least one deformable pad (5) attached to a means of actuation (6, 7, 9, 10). The deformable pad (5) is forced against the climbing surface (not shown) by a servo motor (7) via the actuation rod (10) in order to evacuate any air between the pad surface (5) and climbing surface (not shown). In alternative embodiments pad actuation (6, 7, 8, 10) could be achieved by alternative methods including linear actuators, permanent magnets, electromagnets, solenoids, servo motors and springs.

Once the pad surface (5) has been forced against the climbing surface (not shown) the pad surface (5) is drawn up towards the chassis (1) by a spring (8) attached to the actuation rod (10) which creates a substantially airtight seal between the outer areas of the lower pad surface (5) and the climbing surface (not shown) thereby adhering the robot platform to the climbing surface (not shown) through the vacuum created under the pad (5).

The suction pads (5) slide against the climbing surface while maintaining a vacuum. Preferably the pad (5) is made from a material which slides against the climbing surface material with minimal friction.

The friction co-efficient of the suction pads should be lower than that of the carriage or driving system which may be, for example, wheels, tracks or a similar mechanism. Preferably a significant difference in friction coefficient is provided such that less optimal climbing surfaces (for example, dusty or greasy surfaces) will still allow the driving system to grip while the suction pad slides over the climbing surface.

The climbing surface, by definition, is a vertical surface or at least a substantially inclined surface such that a platform would not normally adhere by friction alone. An example climbing surface is sheet stainless steel, such as found in a stainless steel tank for storage of substances like milk, grain, or wine.

The robotic platform is intended to carry a payload such as inspection equipment, remote controllers, wireless communication, camera and video elements, sensors, and tools.

The suction pad surface (5) elastically conforms to climbing surfaces (not shown) and can be elastically deformed by applying force (actuation force) to a point on the pad. The point may be the geometric centre but other points or multiple points may be used depending on the shape of the pad. For example, a rectangular pad may have two points where force may be applied. Preferably the point is located at the geometrical centre so that even deformation is created on all sides of the pad and an even seal is created.

The result of this deformation is the creation of an area in vacuum or at lower than atmospheric pressure surrounded by a substantially airtight seal between the suction pad (5) and the climbing surface. The vacuum created within the vacuum area serves to counter the deformation force on the pad and thus the available adhesion force can be controlled by varying the actuation force on the pad.

The pads (5) are preferably fabricated from an elastic material such as rubber and are designed to minimise the contact area between the suction pad (5) and the climbing surface (not shown).

Preferably the pad has a substantially planar surface when not attached. Preferably the pad has a raised or conical section located at or near the pad centre. The conical shape, the thickness and elasticity of the rubber and the reinforcing within the rubber all contribute to the formation of a thin seal.

The pads (5) have an approximately planar contact surface when not generating vacuum and as a result the sealing region formed between the pad and the climbing surface is thin.

The pads may be any geometric shape in which all internal angles are less than 180 degrees. In some embodiments the pads are circular in shape. The pads may have a have a diameter larger than 2.5 times the diameter of the actuation rod (10).

In one embodiment, for adhesion to stainless steel climbing surfaces the pads (5) are 100 mm in diameter and composed of 4.8 mm thick natural rubber with deformation characteristics modified by a reinforcing network of fibres.

Reinforcing the pads allows the load placed on the deformed suction pad by the puller mechanism and the vacuum to be more evenly distributed than a pad without reinforcement. Having a more even distribution means the seal formed is more uniform. For example, a circular pad without reinforcing has a tendency to form a square seal meaning suction is lost more rapidly because a corner of the seal reaches the edge of the pad before any part of a circular seal would.

According to one embodiment the circular pads have a 100 mm diameter. These pads may each be capable of exerting up to or greater than 53 kg of adhesion force.

The suction pads may be constructed of a material at least about 3 mm thick, or are about 3.8, 4.8, or 7.5 mm thick, or not more than 7.5 mm thick.

Preferably the suction pads are circular and may be constructed at least 80 mm in diameter, or are about 80, 90, 100, 110, 120, or not more than 120 mm in diameter.

The material the pad is fabricated from and the surface friction coefficient determine the dragging force and hence speed of locomotion possible, and the re-priming frequency required.

The pad material may incorporate reinforcing material to optimize deformation characteristics when the vacuum is actuated. Fibres are preferably used to reinforce the pads to create the desired deformation characteristics.

Optimal deformation is characterised by the seal being a regular shape and mimicking that of the pad. For example, the optimum deformation of a circular pad is that which provides a circular seal. The adhesive force provided by the pad is proportional to the area within the seal. Suction is lost completely when the seal reaches the edge of the pad, such as then the pad load increases or air leaks into the vacuum area.

The controller is preferably programmed to re-prime the pads sequentially to prevent the possibility of total loss of adhesion to the climbing surface if all pads re-primed simultaneously. In a preferred embodiment the re-priming frequency is as low as 0.03 Hz.

In experiments conducted, a robotic climbing platform with 4×100 mm diameter rubber suction pads (5) and a payload of 5 kg, moving at 0.2 meters per second achieved the following adhesion times before re-pruning was required:
4.5 mm pad thickness=50 seconds
3.5 mm pad thickness=300 seconds
4.5 mm pad thickness reinforced with mesh=still adhering after 10 minutes.

By only re-priming the suction pads when the adhesion force required to maintain the platform in contact with the climbing surface is about to fail, only a low power source is required to enable the robot platform to operate for significant durations of time, without the need for heavy batteries or external tethers to provide power.

Figure 3:
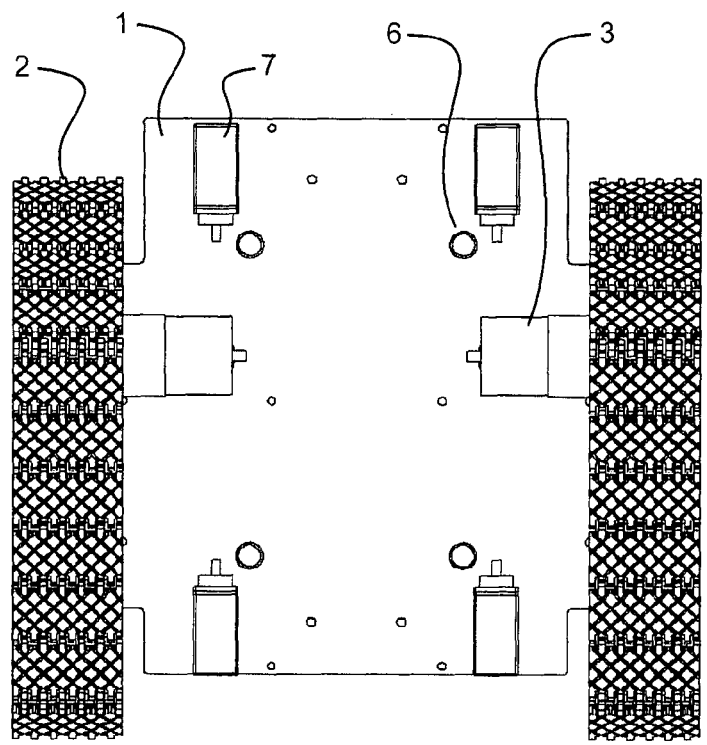
FIG. 3 is a top view of a robot platform according to one embodiment of the invention.

FIG. 3 provides a top view of the robotic climbing platform comprising the chassis (1) to which controllers, sensors and tools can be attached (not shown).

Figure 4:
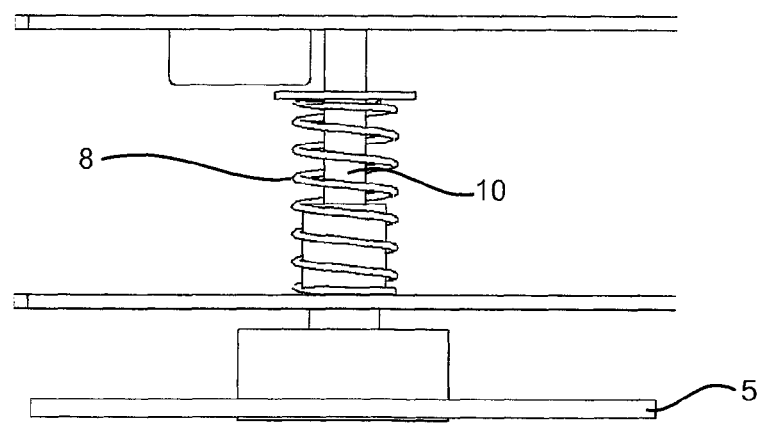
FIG. 4 is a side view of the spring mechanism according to one embodiment of the invention.

FIG. 4 provides a side view of the pad (5) and spring (8) configuration according to a preferred embodiment.

FIGS. 5 through 8 provide various views of a passive suction mechanism for robotic climbing platform according to a second embodiment.

Figure 5:
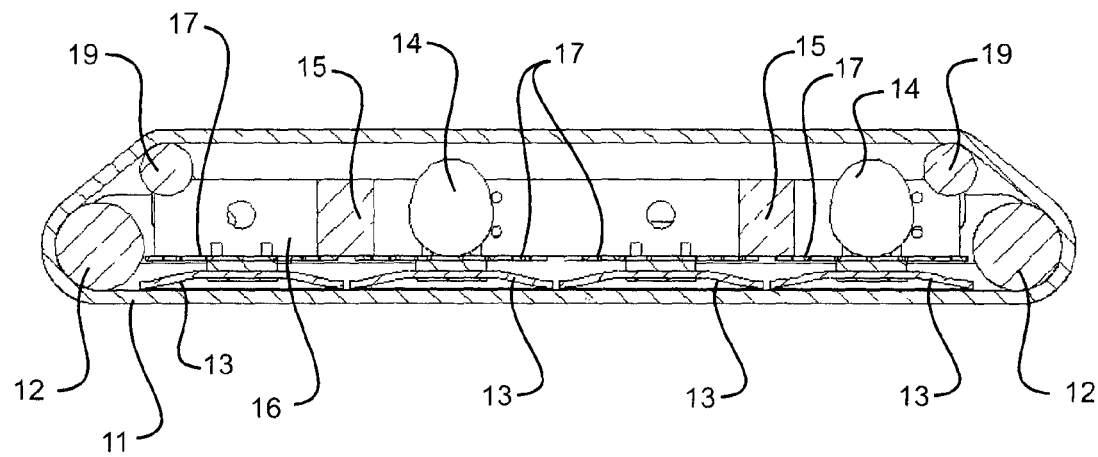
FIG. 5 is a side view of a belt mechanism according to a second embodiment of the invention.

In FIG. 5 a belt or track (11) is provided on which the robotic platform is driven.

The outer belt surface is deformable so as to create vacuum areas between the belt surface and climbing surface when a vacuum force is applied to the belt (11) through the suction pad (13).

The belt follows a belt path including a climbing surface contact portion and a return portion. Suction pads are arranged within the belt path adjacent the inner surface of the belt in the contact portion of the belt path.

According to one embodiment the belt (11) may comprise multiple layers of material such that the desired friction coefficients are provided. The belt (11) has a low friction coefficient on the inner belt surface, and a high friction coefficient on the outer belt surface.

Rollers (12) are provided for each track on a robotic platform. Preferably one roller is driven by a motor in order to provide locomotion force, and the other roller is free-wheeling.

Servo motors and cams (14) are capable of applying a force to the pads (13) to press the pad onto the belt (11) inner surface and toward the climbing surface and force out the air between the pad (13), belt (11) and climbing surface.

The servo and cam (14) may be used to pull the pads from the climbing surface or alternatively spring plates (17) and leg springs provide sufficient force to lift the centre of the suction pads (13) away from the inner surface of the belt (11) thereby creating a vacuum area under the pad (13) and belt (11) between the outer belt surface and the climbing surface.

Preferably additional rollers (19) provide clearance between the chassis (15, 16), servo motors (14) and the belt (11).

Chassis rails (16) act as mounting points for the servos (14) and spring plates (17) and allow for attachment of the leg springs (18). Chassis spacers (15) may be incorporated to strengthen the chassis and maintain correct distances between the chassis rails (16).

Deformable suction pads (13) are capable of attracting the belt (11) lower surface towards them when force is applied by the servo motor and cam (14).

Figure 6:
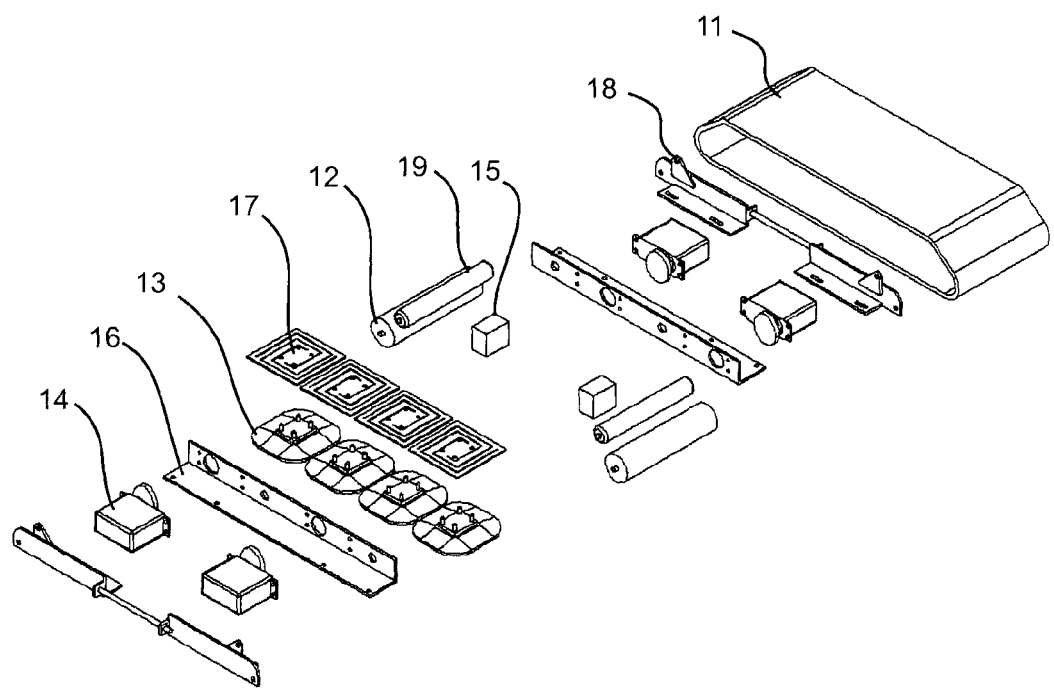
FIG. 6 is an exploded view of the components of a belt mechanism according to a second embodiment of the invention.

FIG. 6 shows an exploded view of the component parts for the passive suction mechanism of the second embodiment.

Figure 7:
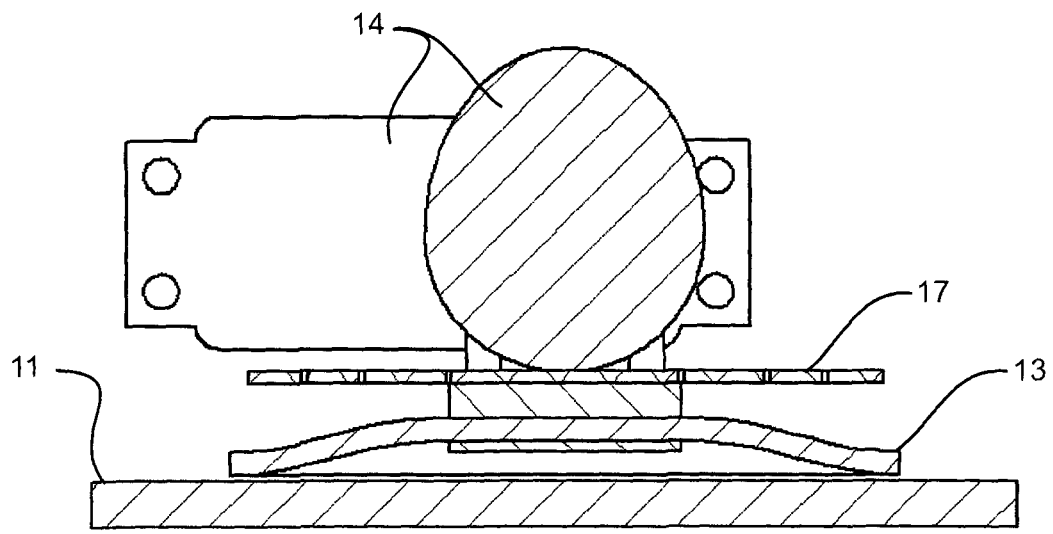
FIG. 7 is a side view of the suction pad component of a belt mechanism according to a second embodiment of the invention.

FIG. 7 shows a detailed side view of a section of the belt (11), servo motor and cam (14), spring plate (17) and deformable suction pad (13) of a preferred embodiment.

Figure 8:
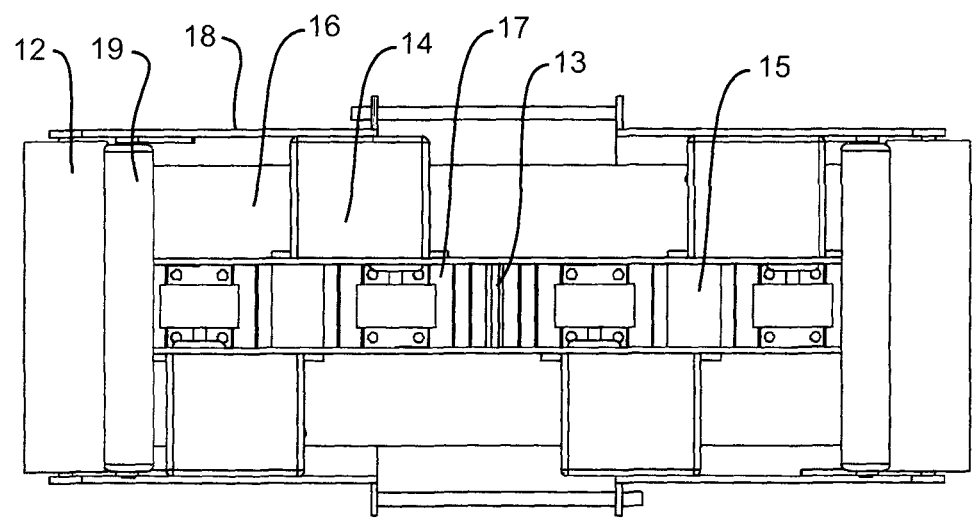
FIG. 8 is a plan view of the chassis with belt removed according to a second embodiment of the invention.

FIG. 8 shows a plan view of the components of the suction adhesion mechanism with the belt (11) from FIG. 5 removed.

Table 1, Table 2 and associated Graph 1, Graph 2 and Graph 3 detail the results of experiments with different suction pad configurations and loads.

Table one shows weight measurement (in kg) results taken during testing of a range of materials, thicknesses diameters of circular pads. Five repeat runs of each test were performed with each variation. The results are then analysed to create data for Graph 1.

The diameter allowable for the suction pads is dependent on the elasticity and thickness of the pads and the diameter of the connection to the suction mechanism. There are no constraints to the diameter of the pad other than those imposed by practicality for each application.

ML refers to the maximum load at which the pads remained attached.

BL refers to the load at which the pads lost suction.

Preferably the suction pad is made of rubber but any material that is elastic enough to form a tight seal against a climbing surface when deformed in the manner of the rubber pads. For example, flexible plastics may be used. Preferably the suction pads are made of nitrile rubber as this material has been demonstrated to create the most reliable seal at a friction coefficient low enough to enable sliding on a climbing surface whilst attached.

Table 1 shows analysis of the data used in Graph 1 to show the trends of maximum loads for each different pad size and material. The data shows a general trend that increasing diameter of the pads increases the maximum supportable load. The downwards curve of some of the samples was observed to be the result of irregular deformation of the pads (shown to be removed in ⅔ insertion reinforced materials).

Table 2 shows data resulting from the testing of different conical parts to connect the rubber pads to the actuator. The results show that larger diameters of the conical part result in larger supported loads by the suction pad.

Figure 9:
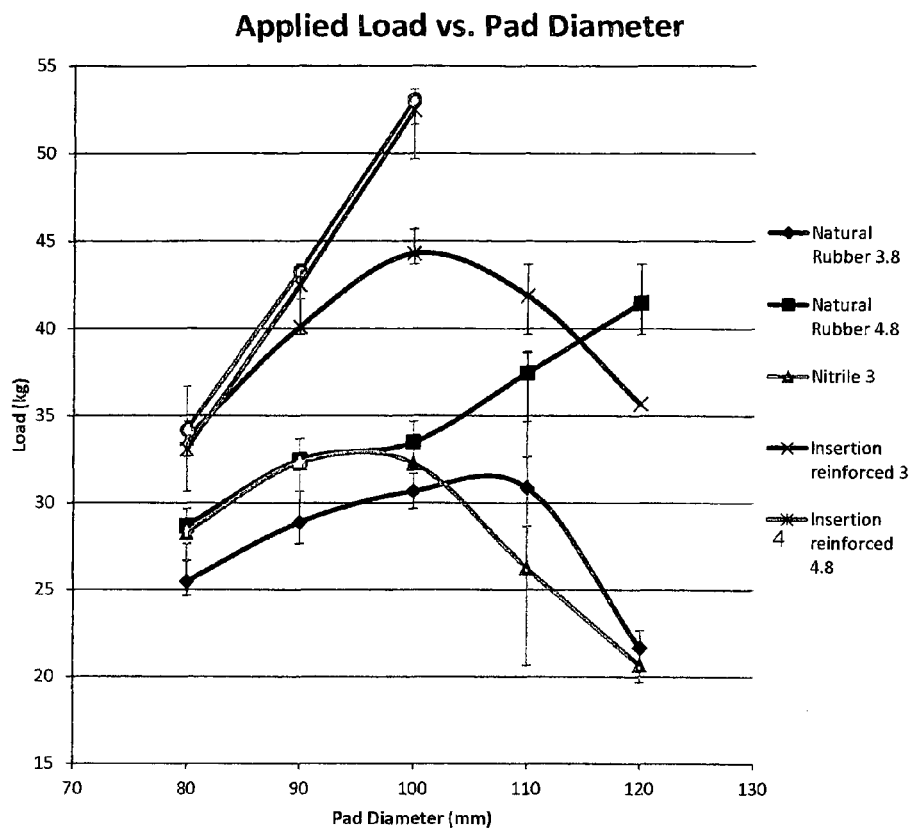
FIG. 9 shows a graph illustrating the relationship between pad diameter and an applied load for various pad material types. For most materials tested a pad diameter of about 100 mm provides the most load support ability.

FIG. 9 shows a graph illustrating the relationship between pad diameter and an applied load for various pad material types. For most materials tested a pad diameter of about 100 mm provides the most load support ability.

Figure 10:
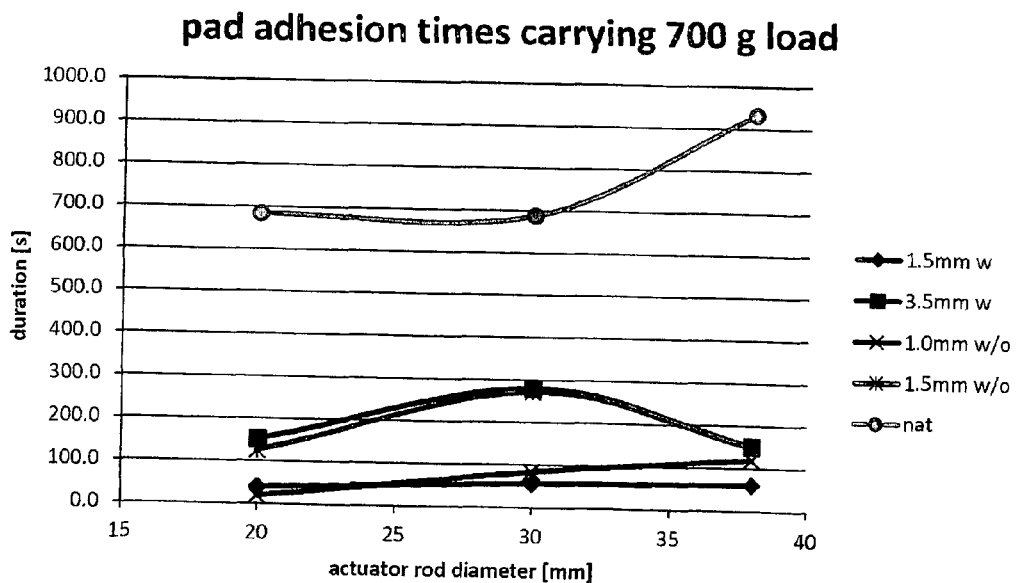
FIG. 10 shows a graph illustrating the typical pad adhesion duration for a range of rod diameters and materials for a 700 g load for a range of pad material thicknesses with and without reinforcing material added.

FIG. 10 shows a graph illustrating the typical pad adhesion duration for a range of rod diameters and materials for a 700 g load for a range of pad material thicknesses with and without reinforcing material added.

Figure 11:
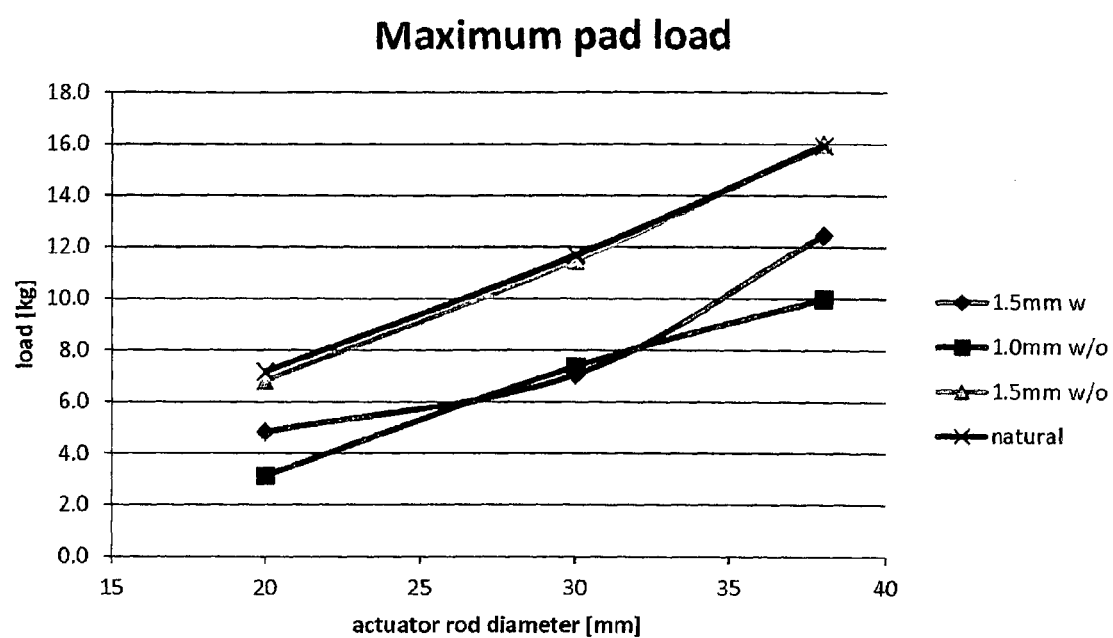
FIG. 11 shows a graph illustrating the maximum load a pad can achieve stabilisation of for a range of rod diameters and pad materials.

FIG. 11 shows a graph illustrating the maximum load a pad can achieve stabilisation of for a range of rod diameters and pad materials.

By comparison with the prior art, a sliding passive suction cup device disclosed in this application, may require as little as 0.2 W/kg of adhesion force and only 1 re-prime every 5 minutes, being limited only to the power required to intermittently compress a spring to actuate the passive suction pad against the climbing surface.

The invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Although the present invention is broadly as defined above, those persons skilled in the art will appreciate that the invention is not limited thereto and that the invention also includes embodiments of which the following description gives examples.

TABLE 1

| Material type | Material thickness (mm) | PadØ (mm) | GripØ (mm) | Grip angle | Run 1 ML | Run 1 BL | Run 2 ML | Run 2 BL | Run 3 ML | Run 3 BL | Run 4 ML | Run 4 BL | Run 5 ML | Run 5 BL | Average | Min ML | Max BL | Error (+Ve) | Error (−Ve) |
|---|---|---|---|---|---|---|---|---|---|---|---|---|---|---|---|---|---|---|---|
| Natural Rubber | 3.8 | 80 | 30 | 15 | 24 | 26 | 24 | 26 | 24 | 26 | 24 | 24 | 24 | 26 | 25.48 | 24.68 | 26.68 | 1.2 | 0.8 |
| | | 90 | | | 28 | 30 | 27 | 29 | 27 | 29 | 27 | 29 | 27 | 29 | 28.88 | 27.68 | 30.68 | 1.8 | 1.2 |
| | | 100 | | | 31 | 31 | 30 | 30 | 30 | 30 | 29 | 31 | 29 | 29 | 30.68 | 29.68 | 31.68 | 1 | 1 |
| | | 110 | | | 29 | 31 | 28 | 28 | 32 | 32 | 30 | 32 | 30 | 30 | 30.88 | 28.68 | 32.68 | 1.8 | 2.2 |
| | | 120 | | | 20 | 22 | 20 | 22 | 20 | 22 | 20 | 22 | 20 | 22 | 21.68 | 20.68 | 22.68 | 1 | 1 |
| Natural Rubber | 4.8 | 80 | | | 27 | 29 | 27 | 29 | 28 | 28 | 28 | 28 | 27 | 29 | 28.68 | 27.68 | 29.68 | 1 | 1 |
| | | 90 | | | 32 | 32 | 32 | 32 | 32 | 32 | 30 | 32 | 32 | 32 | 32.48 | 30.68 | 32.68 | 0.2 | 1.8 |
| | | 100 | | | 32 | 34 | 34 | 34 | 32 | 34 | 34 | 34 | 30 | 30 | 33.48 | 30.68 | 34.68 | 1.2 | 2.8 |
| | | 110 | | | 34 | 36 | 36 | 38 | 38 | 38 | 36 | 38 | 36 | 38 | 37.48 | 34.68 | 38.68 | 1.2 | 2.8 |
| | | 120 | | | 41 | 43 | 41 | 43 | 39 | 41 | 39 | 41 | 39 | 41 | 41.48 | 39.68 | 43.68 | 2.2 | 1.8 |
| Nitrile | 3 | 80 | | | 26 | 28 | 27 | 29 | 27 | 27 | 27 | 29 | 27 | 29 | 28.28 | 26.68 | 29.68 | 1.4 | 1.6 |
| | | 90 | | | 31 | 33 | 30 | 32 | 30 | 32 | 31 | 33 | 32 | 32 | 32.28 | 30.68 | 33.68 | 1.4 | 1.6 |
| | | 100 | | | 34 | 34 | 32 | 32 | 30 | 30 | 30 | 32 | 30 | 32 | 32.28 | 30.68 | 34.68 | 2.4 | 1.6 |
| | | 110 | | | 32 | 34 | 25 | 25 | 20 | 20 | 30 | 30 | 20 | 20 | 26.28 | 20.68 | 34.68 | 8.4 | 5.6 |
| | | 120 | | | 20 | 22 | 20 | 20 | 20 | 20 | 20 | 20 | 19 | 19 | 20.68 | 19.68 | 22.68 | 2 | 1 |
| Insertion reinforced | 3 | 80 | | | 32 | 34 | 32 | 34 | 32 | 34 | 32 | 34 | 32 | 34 | 33.68 | 32.68 | 34.68 | 1 | 1 |
| | | 90 | | | 39 | 41 | 39 | 41 | 39 | 39 | 39 | 39 | 39 | 39 | 40.08 | 39.68 | 41.68 | 1.6 | 0.4 |
| | | 100 | | | 43 | 45 | 43 | 45 | 43 | 45 | 43 | 43 | 43 | 43 | 44.28 | 43.68 | 45.68 | 1.4 | 0.6 |
| | | 110 | | | 43 | 43 | 41 | 41 | 41 | 43 | 41 | 41 | 39 | 39 | 41.88 | 39.68 | 43.68 | 1.8 | 2.2 |
| | | 120 | | | 35 | 35 | 35 | 35 | 35 | 35 | 35 | 35 | 35 | 35 | 35.68 | 35.68 | 35.68 | 0 | 0 |
| Insertion reinforced | 4.8 | 80 | | | 32 | 32 | 32 | 34 | 32 | 34 | 32 | 32 | 32 | 32 | 33.08 | 32.68 | 34.68 | 1.6 | 0.4 |
| | | 90 | | | 41 | 43 | 41 | 43 | 41 | 43 | 41 | 41 | 41 | 43 | 42.48 | 41.68 | 43.68 | 1.2 | 0.8 |
| | | 100 | | | 51 | 51 | 51 | 53 | 51 | 53 | 51 | 53 | 51 | 53 | 52.48 | 51.68 | 53.68 | 1.2 | 0.8 |
| | | 110 | | | 53 | — | 53 | — | 53 | — | 53 | — | 53 | — | 53.68 | 53.68 | 53.68 | 0 | 0 |
| | | 120 | | | 53 | — | 53 | — | 53 | — | 53 | — | 53 | — | 53.68 | 53.68 | 53.68 | 0 | 0 |
| Insertion 2x reinforced | 7.5 | 80 | | | 30 | 35 | 32 | 32 | 34 | 36 | 34 | 34 | 34 | 34 | 34.18 | 30.68 | 36.68 | 2.5 | 3.5 |
| | | 90 | | | 41 | 43 | 41 | 43 | 43 | 43 | 43 | 43 | 43 | 43 | 43.28 | 41.68 | 43.68 | 0.4 | 1.6 |
| | | 100 | | | 49 | 51 | 53 | 53 | 53 | 53 | 53 | 53 | 53 | 53 | 53.08 | 49.68 | 53.68 | 0.6 | 3.4 |
| | | 110 | | | 53 | — | 53 | — | 53 | — | 53 | — | 53 | — | 53.68 | 53.68 | 53.68 | 0 | 0 |
| | | 120 | | | 53 | — | 53 | — | 53 | — | 53 | — | 53 | — | 53.68 | 53.68 | 53.68 | 0 | 0 |

TABLE 2

| Material | 10A = natural rubber | | | | | | | | | | | |
|---|---|---|---|---|---|---|---|---|---|---|---|---|
| Pad | 20Ø × 15' | | | | | | 30Ø × 15' | | | | | |
| Run | 5 | 2 | 3 | 4 | 5 | | 1 | 2 | 3 | 4 | 5 | Average |
| Diameter [mm] | 20 | 20 | 20 | 20 | 20 | 20 | 30 | 30 | 30 | ≮ | 30 | 30 |
| Area [mm$^2$] | 15.71 | 15.71 | 15.71 | 15.71 | 15.71 | 15.71 | 23.56 | 23.56 | 23.56 | 23.56 | 23.56 | 23.56 |
| Load [kg] | 0.68 | 0.68 | 0.68 | | | 0.68 | 0.69 | 0.69 | 0.69 | | | 0.69 |
| Duration [mm] | 601 | 660 | 728 | | | 683 | 453 | 607 | 1201 | | | 687 |
| Max Load [kg] | 7.12 | 7.01 | 7.58 | 6.97 | 7.18 | 7.172 | 11.74 | 11.86 | 11.76 | 11.73 | 11.39 | 11.696 |
| Force [N] | 69.8 | 68.8 | 74.4 | 68.4 | 70.4 | 70.4 | 115.2 | 116.3 | 115.4 | 115.1 | 111.7 | 114.7 |
| Pressure [kPa] | 4447 | 4378 | 4734 | 4353 | 4484 | 4479 | 4388 | 4938 | 4896 | 4854 | 4742 | 4870 |

| Material | 10B = 1 mm w/o reinforcing | | | | | | | | | | | |
|---|---|---|---|---|---|---|---|---|---|---|---|---|
| Pad | 20Ø × 15' | | | | | | 30Ø × 15' | | | | | |
| Run | 1 | 2 | 3 | 4 | 5 | Average | 1 | 2 | 3 | 4 | 5 | Average |
| Diameter [mm] | 20 | 20 | 20 | 20 | 20 | 20 | 30 | 30 | 30 | 30 | 30 | 30 |
| Area [mm$^2$] | 15.71 | 15.71 | 15.71 | 15.71 | 15.71 | 15.71 | 23.56 | 23.56 | 23.56 | 23.56 | 23.56 | 23.56 |
| Load [kg] | 0.62 | 0.62 | 0.62 | 0.62 | 0.62 | 0.62 | 0.62 | 0.62 | 0.62 | 0.62 | 0.62 | 0.62 |
| Duration [%] | 16.6 | 22.5 | 16.2 | 14.8 | 23.2 | 18.66 | 75.6 | 72.3 | 84.0 | 90.8 | 95.4 | 83.816 |
| Max Load [kg] | 2.7 | 3.5 | 3.8 | 3.0 | 2.7 | 3.128 | 7.3 | 7.0 | 7.6 | 7.6 | 7.5 | 7.38 |
| Force [N] | 26.4 | 33.9 | 37.6 | 29.1 | 26.4 | 30.7 | 71.7 | 68.5 | 74.1 | 74.7 | 73.1 | 72.4 |
| Pressure [kPa] | 1679.97 | 2160.85 | 2391.93 | 1654.84 | 1679.97 | 1953.51 | 3043.51 | 2906.12 | 3143.44 | 3168.42 | 3101.80 | 3072.66 |

| Material | 10C = 1.5 mm w reinforcing | | | | | | | | | | | |
|---|---|---|---|---|---|---|---|---|---|---|---|---|
| Pad | 20Ø × 15' | | | | | | 30Ø × 15' | | | | | |
| Run | 1 | 2 | 3 | 4 | 5 | Average | 1 | 2 | 3 | 4 | 5 | Average |
| Diameter [mm] | 20 | 20 | 20 | 20 | 20 | 20 | 30 | 30 | 30 | 30 | 30 | 30 |
| Area [mm$^2$] | 15.71 | 15.71 | 15.71 | 15.71 | 15.71 | 15.71 | 23.56 | 23.56 | 23.56 | 23.56 | 23.56 | 23.56 |
| Load [kg] | 0.66 | 0.66 | 0.66 | 0.66 | 0.66 | 0.66 | 0.69 | 0.69 | 0.69 | 0.69 | 0.69 | 0.69 |
| Duration [%] | 52.0 | 38.4 | 40.2 | 37.6 | 34.3 | 40.5 | 48.7 | 56.0 | 58.9 | 60.4 | 56.1 | 56.0 |
| Max Load [kg] | 4.6 | 4.9 | 4.7 | 5.2 | 4.9 | 4.8 | 6.2 | 6.9 | 7.9 | 6.9 | 7.5 | 7.1 |
| Max Force [N] | 44.8 | 47.8 | 45.8 | 50.5 | 48.3 | 47.4 | 60.8 | 67.3 | 77.5 | 67.7 | 73.1 | 69.3 |
| Max Pressure [kPa] | 2854 | 3041 | 2917 | 3216 | 3073 | 3020 | 2581 | 2856 | 3289 | 2873 | 3102 | 2940 |

| Material | 10D = 3.5 mm w reinforcing | | | | | | | | | | | |
|---|---|---|---|---|---|---|---|---|---|---|---|---|
| Pad | 20Ø × 15' | | | | | | 30Ø × 15' | | | | | |
| Run | 1 | 2 | 3 | 4 | 5 | Average | 1 | 2 | 3 | 4 | 5 | Average |
| Diameter [mm] | 20 | 20 | 20 | 20 | 20 | 20 | 30 | 30 | 30 | 30 | 30 | 30 |
| Area [mm$^2$] | 15.71 | 15.71 | 15.71 | 15.71 | 15.71 | 15.71 | 23.56 | 23.56 | 23.56 | 23.56 | 23.56 | 23.56 |
| Load [kg] | 0.69 | 0.69 | 0.69 | 0.69 | 0.69 | 0.69 | 0.7 | 0.7 | 0.7 | 0.7 | 0.7 | 0.7 |
| Duration [mm] | 104.6 | 113.1 | 143.1 | 149.5 | 250.7 | 152.2 | 261.1 | 338.8 | 261.0 | 268.7 | 271.4 | 280.2 |
| Max Load [kg] | | | | | | #DIV/01 | | | | | | #DIV/01 |
| Max Force [N] | 0 | 0 | 0 | 0 | 0 | 0 | 0 | 0 | 0 | 0 | 0 | 0 |
| Max Pressure [kPa] | 0.00 | 0.00 | 0.00 | 0.00 | 0.00 | 0.00 | 0.00 | 0.00 | 0.00 | 0.00 | 0.00 | 0.00 |

| Material | 10A = natural rubber | | | | | | | | | | | |
|---|---|---|---|---|---|---|---|---|---|---|---|---|
| Pad | 38Ø × 15' | | | | | | 30Ø × 30' | | | | | |
| Run | 1 | 2 | 3 | 4 | 5 | Average | 1 | 2 | 3 | 4 | 5 | Average |
| Diameter [mm] | 38 | 38 | 38 | 38 | 38 | 38 | 30 | 30 | 30 | 30 | 30 | 30 |
| Area [mm$^2$] | 29.85 | 29.85 | 29.85 | 29.85 | 29.85 | 29.85 | 23.56 | 23.56 | 23.56 | 23.56 | 23.56 | 23.56 |
| Load [kg] | 0.7 | 0.7 | 0.7 | | | 0.7 | 0.68 | 0.68 | 0.68 | | | 0.68 |
| Duration [mm] | 907 | 970 | 922 | | | 933 | 613 | 523 | 601 | | | 611.333 |
| Max Load [kg] | 15.7 | 15.54 | 16.06 | 16.02 | 16.28 | 15.92 | 10.83 | 10.83 | 11.64 | 12.08 | 11.86 | 11.448 |
| Force [N] | 154.0 | 152.4 | 157.5 | 157.2 | 159.7 | 156.2 | 106.2 | 106.2 | 114.2 | 118.5 | 116.3 | 112.3 |
| Pressure [kPa] | 5161 | 5108 | 5279 | 5266 | 5351 | 5233 | 4509 | 4509 | 4546 | 5029 | 4938 | 4766 |

| Material | 10B = 1 mm w/o reinforcing | | | | | | | | | | | |
|---|---|---|---|---|---|---|---|---|---|---|---|---|
| Pad | 38Ø × 15' | | | | | | 30Ø × 30' | | | | | |
| Run | 1 | 2 | 3 | 4 | 5 | Average | 1 | 2 | 3 | 4 | 5 | Average |
| Diameter [mm] | 38 | 38 | 38 | 38 | 38 | 38 | 30 | 30 | 30 | 30 | 30 | 30 |
| Area [mm$^2$] | 29.85 | 29.85 | 29.85 | 29.85 | 29.85 | 29.85 | 23.56 | 23.56 | 23.56 | 23.56 | 23.56 | 23.56 |
| Load [kg] | 0.62 | 0.62 | 0.62 | 0.62 | 0.62 | 0.62 | 0.00 | 0.00 | 0.00 | 0.00 | 0.00 | 0 |
| Duration [%] | 101.0 | 100.2 | 134.6 | 132.5 | 131.6 | 119.998 | 0.0 | 0.0 | 0.0 | 0.0 | 0.0 | 0 |

TABLE 2-continued

| | | | | | | | | | | | | |
|---|---|---|---|---|---|---|---|---|---|---|---|---|
| Max Load [kg] | 9.5 | 8.9 | 10.1 | 10.8 | 10.7 | 9.938 | 0.0 | 0.0 | 0.0 | 0.0 | 0.0 | 0 |
| Force [N] | 93.0 | 87.1 | 98.9 | 105.7 | 105.3 | 98.0 | 0.0 | 0.0 | 0.0 | 0.0 | 0.0 | 0.0 |
| Pressure [kPa] | 3116.05 | 2918.83 | 3313.26 | 3540.06 | 3526.92 | 3283.02 | 0.00 | 0.00 | 0.00 | 0.00 | 0.00 | 0.00 |

| Material | 10C = 1.5 mm w reinforcing | | | | | | | | | | | |
|---|---|---|---|---|---|---|---|---|---|---|---|---|
| Pad | 38Ø × 15' | | | | | | 30Ø × 30' | | | | | |
| Run | 1 | 2 | 3 | 4 | 5 | Average | 1 | 2 | 3 | 4 | 5 | Average |
| Diameter [mm] | 38 | 38 | 38 | 38 | 38 | 38 | 30 | 30 | 30 | 30 | 30 | 30 |
| Area [mm$^2$] | 29.85 | 29.85 | 29.85 | 29.85 | 29.85 | 29.85 | 23.56 | 23.56 | 23.56 | 23.56 | 23.56 | 23.56 |
| Load [kg] | 0.71 | 0.71 | 0.71 | 0.71 | 0.71 | 0.71 | 0 | 0 | 0 | 0 | 0. | 0 |
| Duration [%] | 53.8 | 64.0 | 60.6 | 64.9 | 50.8 | 60.8 | 0.0 | 0.0 | 0.0 | 0.0 | 0.0 | 0 |
| Max Load [kg] | 12.5 | 12.7 | 12.2 | 12.3 | 12.6 | 12.4 | 0.0 | 0.0 | 0.0 | 0.0 | 0.0 | 0 |
| Max Force [N] | 122.2 | 124.9 | 119.4 | 120.7 | 123.1 | 122.1 | 0.0 | 0.0 | 0.0 | 0.0 | 0.0 | 0.0 |
| Max Pressure [kPa] | 4395 | 4184 | 4000 | 4043 | 4125 | 4090 | 0 | 0 | 0 | 0 | 0 | 0.00 |

| Material | 10D = 3.5 mm w reinforcing | | | | | | | | | | | |
|---|---|---|---|---|---|---|---|---|---|---|---|---|
| Pad | 38Ø × 15' | | | | | | 30Ø × 30' | | | | | |
| Run | 1 | 2 | 3 | 4 | 5 | Average | 1 | 2 | 3 | 4 | 5 | Average |
| Diameter [mm] | 38 | 38 | 38 | 38 | 38 | 38 | 30 | 30 | 30 | 30 | 30 | 30 |
| Area [mm$^2$] | 29.85 | 29.85 | 29.85 | 29.85 | 29.85 | 29.85 | 23.56 | 23.56 | 23.56 | 23.56 | 23.56 | 23.56 |
| Load [kg] | 0.73 | 0.73 | 0.73 | 0.73 | 0.73 | 0.73 | 0.71 | 0.71 | 0.71 | 0.71 | 0.71 | 0.71 |
| Duration [mm] | 190.3 | 139.3 | 126.9 | 149.4 | 154.5 | 152.1 | 52.6 | 74.6 | 56.3 | 109.7 | 81.8 | 83.0 |
| Max Load [kg] | | | | | | #DIV/01 | | | | | | #DIV/01 |
| Max Force [N] | 0 | 0 | 0 | 0 | 0 | 0 | 0 | 0 | 0 | 0 | 0 | 0 |
| Max Pressure [kPa] | 0.00 | 0.00 | 0.00 | 0.00 | 0.00 | 0.00 | 0.00 | 0.00 | 0.00 | 0.00 | 0.00 | 0.00 |

| Material | 10A = natural rubber | | | | | |
|---|---|---|---|---|---|---|
| Pad | 30Ø × 45' | | | | | |
| Run | 1 | 2 | 3 | 4 | 5 | Average |
| Diameter [mm] | 30 | 30 | 30 | 30 | 30 | 30 |
| Area [mm$^2$] | 23.56 | 23.56 | 23.56 | 23.56 | 23.56 | 23.56 |
| Load [kg] | 0.7 | 0.7 | 0.7 | 0.7 | 0.7 | 0.7 |
| Duration [mm] | 9.4 | 7 | 6.5 | 4.1 | 4.7 | 6.34 |
| Max Load [kg] | 8.78 | 10.06 | 10.2 | 8.89 | 10.59 | 9.704 |
| Force [N] | 86.1 | 98.7 | 100.1 | 87.2 | 103.9 | 95.2 |
| Pressure [kPa] | 3656 | 4188 | 4247 | 3701 | 4409 | 4040 |

| Material | 10B = 1 mm w/o reinforcing | | | | | |
|---|---|---|---|---|---|---|
| Pad | 30Ø × 45' | | | | | |
| Run | 1 | 2 | 3 | 4 | 5 | Average |
| Diameter [mm] | 30 | 30 | 30 | 30 | 30 | 30 |
| Area [mm$^2$] | 23.56 | 23.56 | 23.56 | 23.56 | 23.56 | 23.56 |
| Load [kg] | 0.00 | 0.00 | 0.00 | 0.00 | 0.00 | 0 |
| Duration [%] | 0.0 | 0.0 | 0.0 | 0.0 | 0.0 | 0 |
| Max Load [kg] | 0.0 | 0.0 | 0.0 | 0.0 | 0.0 | 0 |
| Force [N] | 0.0 | 0.0 | 0.0 | 0.0 | 0.0 | 0.0 |
| Pressure [kPa] | 0.00 | 0.00 | 0.00 | 0.00 | 0.00 | 0.00 |

| Material | 10C = 1.5 mm w reinforcing | | | | | |
|---|---|---|---|---|---|---|
| Pad | 30Ø × 45' | | | | | |
| Run | 1 | 2 | 3 | 4 | 5 | Average |
| Diameter [mm] | 30 | 30 | 30 | 30 | 30 | 30 |
| Area [mm$^2$] | 23.56 | 23.56 | 23.56 | 23.56 | 23.56 | 23.56 |
| Load [kg] | 0 | 0 | 0 | 0 | 0 | 0 |
| Duration [%] | 0.0 | 0.0 | 0.0 | 0.0 | 0.0 | 0 |
| Max Load [kg] | 0.0 | 0.0 | 0.0 | 0.0 | 0.0 | 0 |
| Max Force [N] | 0.0 | 0.0 | 0.0 | 0.0 | 0.0 | 0.0 |
| Max Pressure [kPa] | 0 | 0 | 0 | 0 | 0 | 0.00 |

TABLE 2-continued

| Material | 10D = 3.5 mm w reinforcing | | | | | |
|---|---|---|---|---|---|---|
| Pad | 30Ø × 45' | | | | | |
| Run | 1 | 2 | 3 | 4 | 5 | Average |
| Diameter [mm] | 30 | 30 | 30 | 30 | 30 | 30 |
| Area [mm²] | 23.56 | 23.56 | 23.56 | 23.56 | 23.56 | 23.56 |
| Load [kg] | 0.70 | 0.70 | 0.70 | 0.70 | 0.70 | 0.7 |
| Duration [mm] | 53.0 | 62.4 | 61.5 | 64.5 | 70.0 | 62.3 |
| Max Load [kg] | | | | | | #DIV/01 |
| Max Force [N] | 0 | 0 | 0 | 0 | 0 | 0 |
| Max Pressure [kPa] | 0.0 | 0.0 | 0.0 | 0.0 | 0.0 | 0.0 |

The invention claimed is:

1. A robotic climbing platform comprising:
a chassis and a carriage adapted to support and move the chassis relative to a climbing surface, the carriage comprising one or more wheels, rollers, or tracks adapted to contact the climbing surface, and a motor adapted to drive one or more wheels, rollers, or tracks when energised, to move the chassis on the climbing surface, and
a passive adhesion mechanism adapted to provide an adhesion force between the climbing platform and the climbing surface, the passive adhesion mechanism including:
one or more suction pads adapted to retain an adhesion force between the climbing platform and the climbing surface during movement, and
an actuator or actuators being arranged to:
cause movement of one or more suction pads toward the climbing surface by application of a first force, such that the suction pad(s) contact the climbing surface and evacuate(s) gasses between the suction pad(s) and the climbing surface, and then
cause movement of the suction pad(s) toward the chassis by application of a second force such that a sealed region of suction is achieved between the climbing surface and the suction pad or pads effective to attach the platform to the climbing surface while allowing sliding movement of the suction pad(s) on the climbing surface as the one or more wheels, rollers, or tracks and motor operate to move the platform on the climbing surface, and hold the platform attached to the climbing surface as the platform moves on the climbing surface.

2. The robotic climbing platform as claimed in claim 1, wherein the magnitude of the adhesion force is controllable by varying the magnitude of the second force.

3. The robotic climbing platform as claimed in claim 1, further comprising one or more sensors adapted to indicate adhesion between a suction pad and the climbing surface and output a signal representative of the adhesion.

4. The robotic climbing platform as claimed in claim 3, further comprising a control system configured to:
receive the signal from one or more of the sensors adapted to indicate adhesion,
output a signal to cause movement of the actuator or actuators, and
compare the indicated adhesion to one or more characteristics.

5. The robotic climbing platform as claimed in claim 4, wherein one said characteristic is a predetermined optimum adhesion indicated by one or more of:
vacuum between the suction pad and the climbing surface,
distance between the actuator and the climbing surface, and
the location of the seal.

6. The robotic climbing platform as claimed in claim 5, wherein the control system is further configured to output a signal to vary the second force such that the predetermined optimum desired adhesion force is achieved between the suction pad and the climbing surface.

7. The robotic climbing platform as claimed in claim 6, wherein the control system is further configured to perform a re-priming procedure when the indicated adhesion is less than a predetermined minimum desired adhesion, comprising the steps of:
outputting a signal to cause the actuator or actuators to generate a first force to actuate the suction pad toward the climbing surface,
outputting a signal to cause the actuator or actuators to generate a second force toward the chassis.

8. The robotic climbing platform as claimed in claim 1, wherein the carriage includes a plurality of wheels adapted to support the chassis from the climbing surface.

9. The robotic climbing platform as claimed in claim 1, wherein the carriage comprises one or more tracks comprising a belt wrapped around at least two rollers, the belt including an inner surface, an outer surface, a climbing surface contact portion and a return portion, and the one or more suction pads have a suction surface located adjacent the inner surface and the climbing surface contact portion of the belt.

10. The robotic climbing platform as claimed in claim 9, wherein the outer belt surface is deformable such that a region of adhesion force is created between the belt outer surface and the climbing surface, and the adhesion force is created between a suction pad and the inner belt surface.

11. The robotic climbing platform as claimed in claim 10, wherein the inner surface of the belt is adapted to allow the belt to slide past or over the suction cup whilst substantially retaining the adhesion force.

12. The robotic climbing platform as claimed in claim 10, wherein the outer surface of the belt is constructed of a material having a high friction coefficient such that the climbing surface is able to be gripped, and at least one of the inner surface of the belt or the suction pad is of a material having a low friction coefficient such that the suction pad may slide across the inner portion of the belt while retaining an adhesion force and the carriage includes at least one roller to support the return portion of the belt from the climbing surface contacting portion of the belt.

13. A robotic climbing platform as claimed in claim 1 comprising at least two said suction pads adapted to retain an adhesion force between the climbing platform and the climbing surface during movement, and an actuator or actuators adapted to cause said movement of the suction pads toward the climbing surface by application of a first force and movement of the suction pads toward the chassis by application of a second force such that a sealed region of suction is achieved between the climbing surface and the suction pad(s) effective to attach the platform to the climbing surface.

14. A robotic climbing platform as claimed in claim 1 comprising at least four said suction pads adapted to retain an adhesion force between the climbing platform and the climbing surface during movement, and an actuator or actuators adapted to cause said movement of the suction pads toward the climbing surface by application of a first force and movement of the suction pads toward the chassis by application of a second force such that a sealed region of suction is achieved between the climbing surface and the suction pad(s) effective to attach the platform to the climbing surface.

15. A robotic climbing platform as claimed in claim 13 comprising a first said actuator adapted to cause said movement of one of the suction pads and a second said actuator adapted to cause said movement of another of the suction pads.

16. A robotic climbing platform as claimed in claim 15 comprising a first said actuator adapted to cause said movement of one or more of the suction pads and a second said actuator adapted to cause said movement of another one or more of the suction pads.

17. A robotic climbing platform as claimed in claim 1, wherein the control system is further configured to perform a re-priming procedure at intervals, comprising the steps of:
outputting a signal to cause the actuator to generate a first force to actuate the suction pad toward the climbing surface,
outputting a signal to cause the actuator to generate a second force toward the chassis.

18. A robotic climbing platform as claimed in claim 15 comprising at least two said suction pads adapted to retain an adhesion force between the climbing platform and the climbing surface during movement, and an actuator or actuators adapted to cause said movement of the suction pads toward the climbing surface by application of a first force and movement of the suction pads toward the chassis by application of a second force such that a sealed region of suction is achieved between the climbing surface and the suction pad(s) effective to attach the chassis to the climbing surface, and wherein the control system is further configured to perform a re-priming procedure of one of the suction pads at a first time and a re-priming procedure of another of the suction pads at a second different time, the re-priming procedure comprising the steps of:
outputting a signal to cause the actuator to generate a first force to actuate the suction pad toward the climbing surface,
outputting a signal to cause the actuator to generate a second force toward the chassis.

19. A method of operating a robotic climbing platform comprising:
providing a platform adapted to support a control system, the platform comprising:
one or more wheels, rollers, or tracks adapted to contact the climbing surface, and a motor adapted to drive one or more wheels, rollers, or tracks when energised, to move the platform on the climbing surface, and
a passive adhesion mechanism including at least one actuator connected to one or more suction pads adapted to retain an adhesion force between the climbing platform and the climbing surface during movement, and
configuring a control system to perform the steps of:
operating the actuator to generate a first force on a suction pad in the direction of a climbing surface such that the suction pad contacts the climbing surface and evacuates gasses between the suction pad and the climbing surface, and
operating the actuator to generate a second force on a suction pad away from the climbing surface such that a sealed region of suction is achieved between the climbing surface and the suction pad effective to attach the chassis to the climbing surface while allowing sliding movement of the suction pad on the climbing surface as the one or more wheels, rollers, or tracks and motor operate to move the chassis on the climbing surface, and hold the platform attached to the climbing surface as the platform moves on the climbing surface.

20. The method of operating a robotic climbing platform as claimed in claim 19, wherein configuring the control system further comprises the steps of:
adapting one or more sensors to indicate adhesion between the suction pad and the climbing surface,
receiving a signal from the one or more sensors indicative of adhesion,
comparing the indicated adhesion to a predetermined adhesion, and
outputting a signal to cause movement of the actuator.

21. The method of operating a robotic climbing platform as claimed in claim 20, wherein a sensor to indicate adhesion is arranged to indicate adhesion by sensing predetermined optimum adhesion force indicated by one or more of:
a vacuum between the suction pad and the climbing surface,
a distance between the actuator and the climbing surface,
a location of the seal, and
a minimum adhesion force to retain the platform on the climbing surface.

22. The method of operating a robotic climbing platform as claimed in claim 21, wherein the control system is further configured to control a re-priming procedure comprising the steps of:
determining adhesion force is less than a predetermined minimum desired adhesion force,
outputting a signal to cause the actuator to generate a first force to actuate the suction pad toward the climbing surface, and
outputting a signal to cause the actuator to generate a second force to actuate the suction pad away from the climbing surface.

* * * * *